Figure 3:
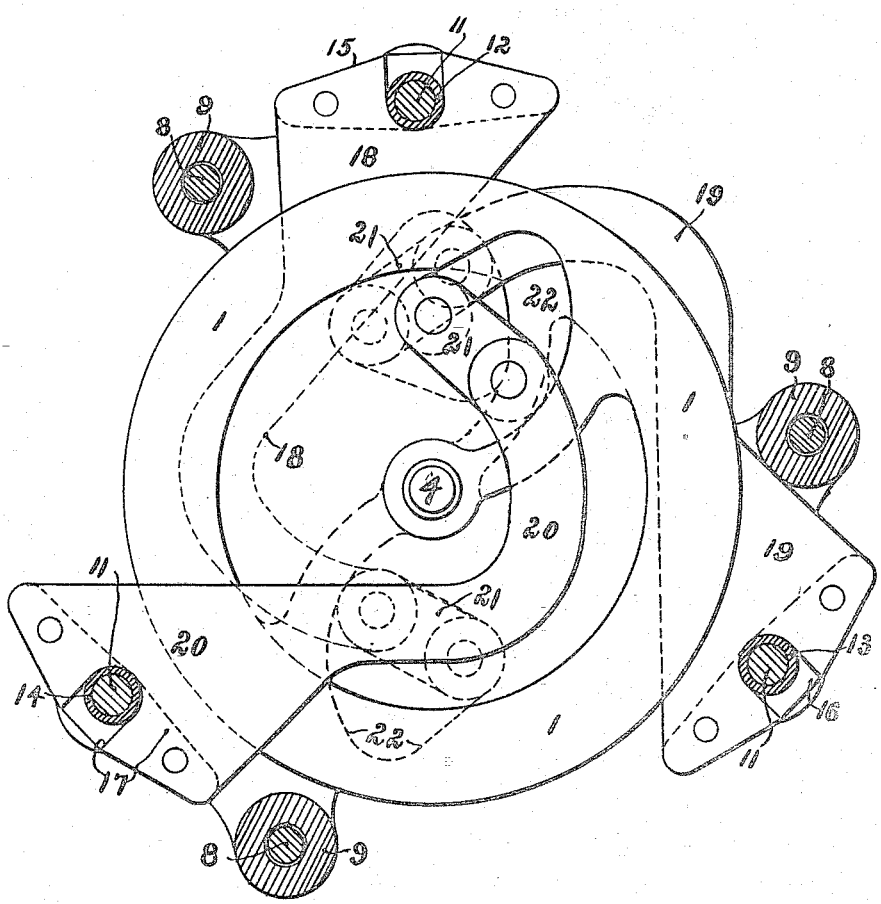

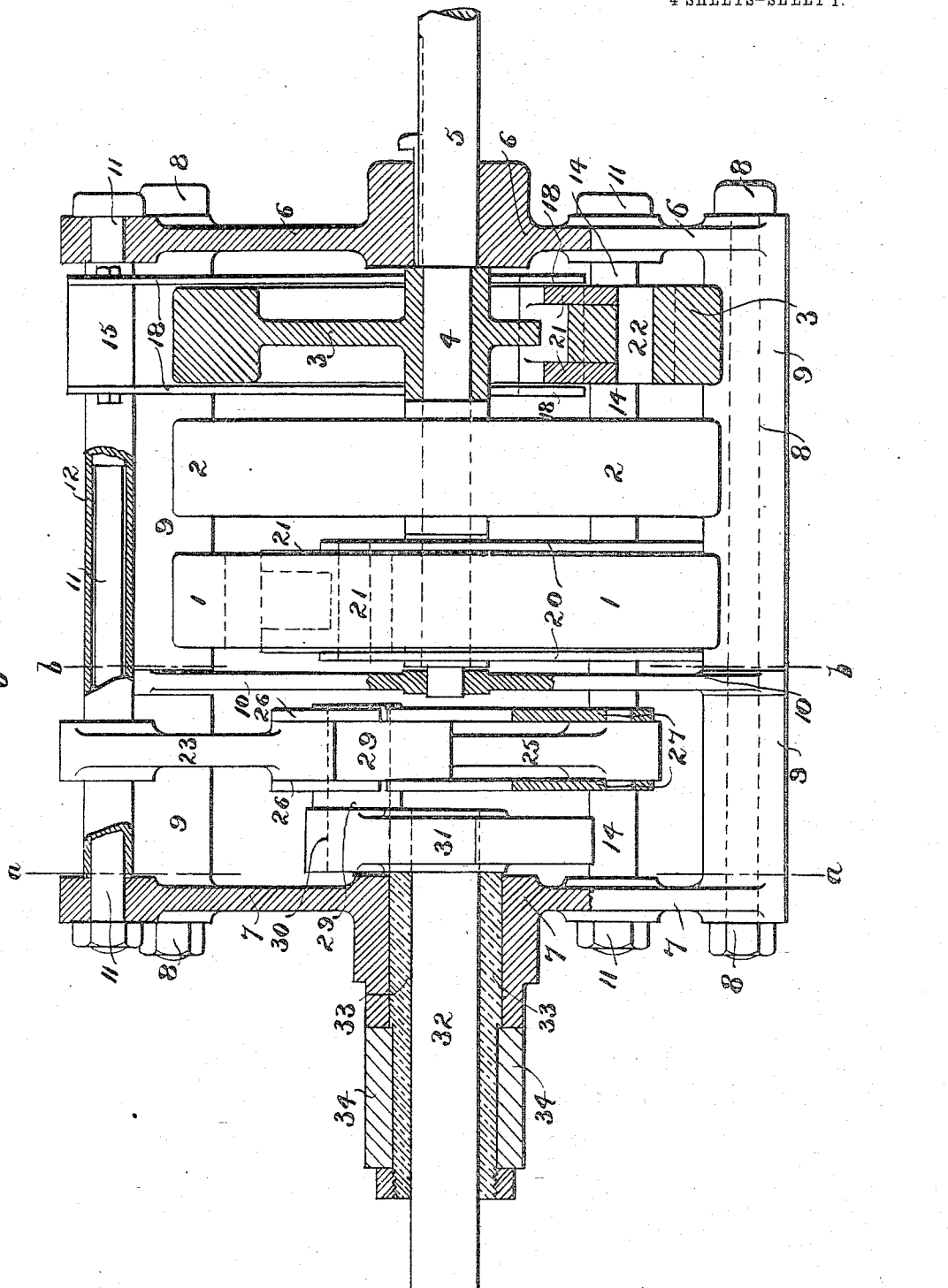

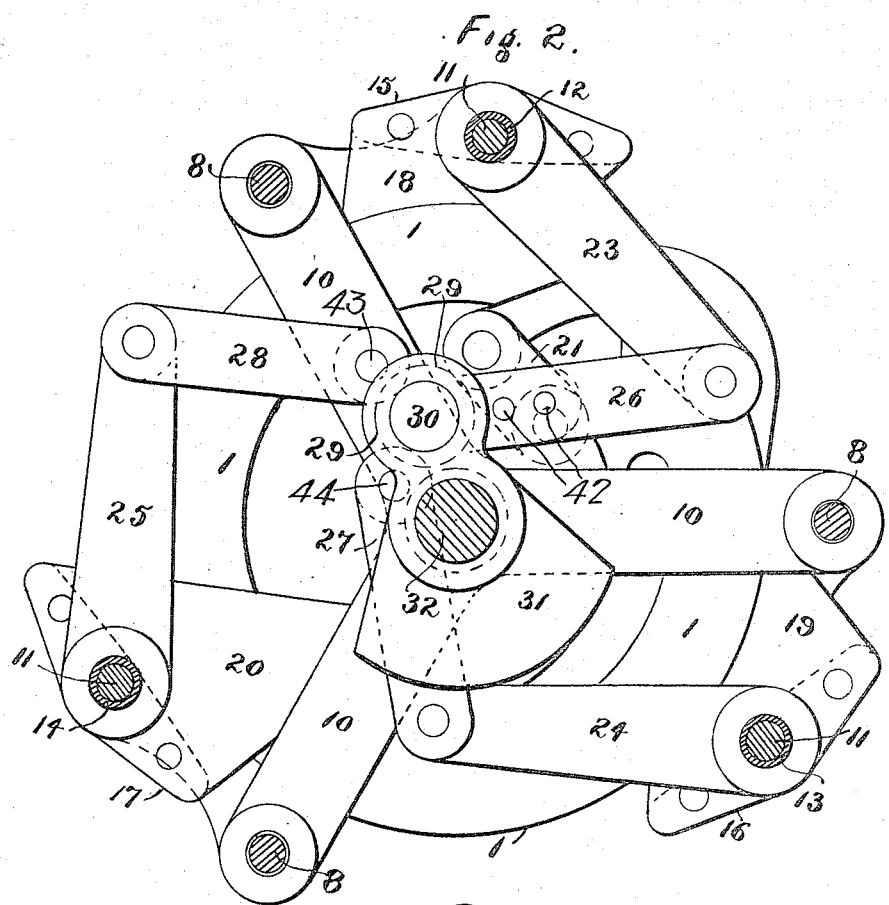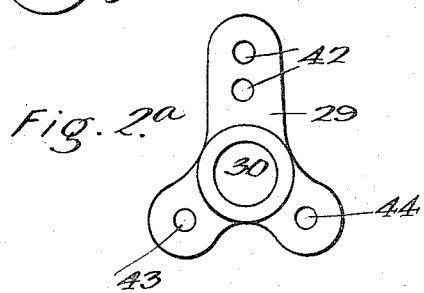

W. HUNT.
ROTARY MECHANISM FOR THE TRANSMISSION OF POWER.
APPLICATION FILED AUG. 16, 1913.

1,127,251. Patented Feb. 2, 1915.

INVENTOR
WILFRED HUNT

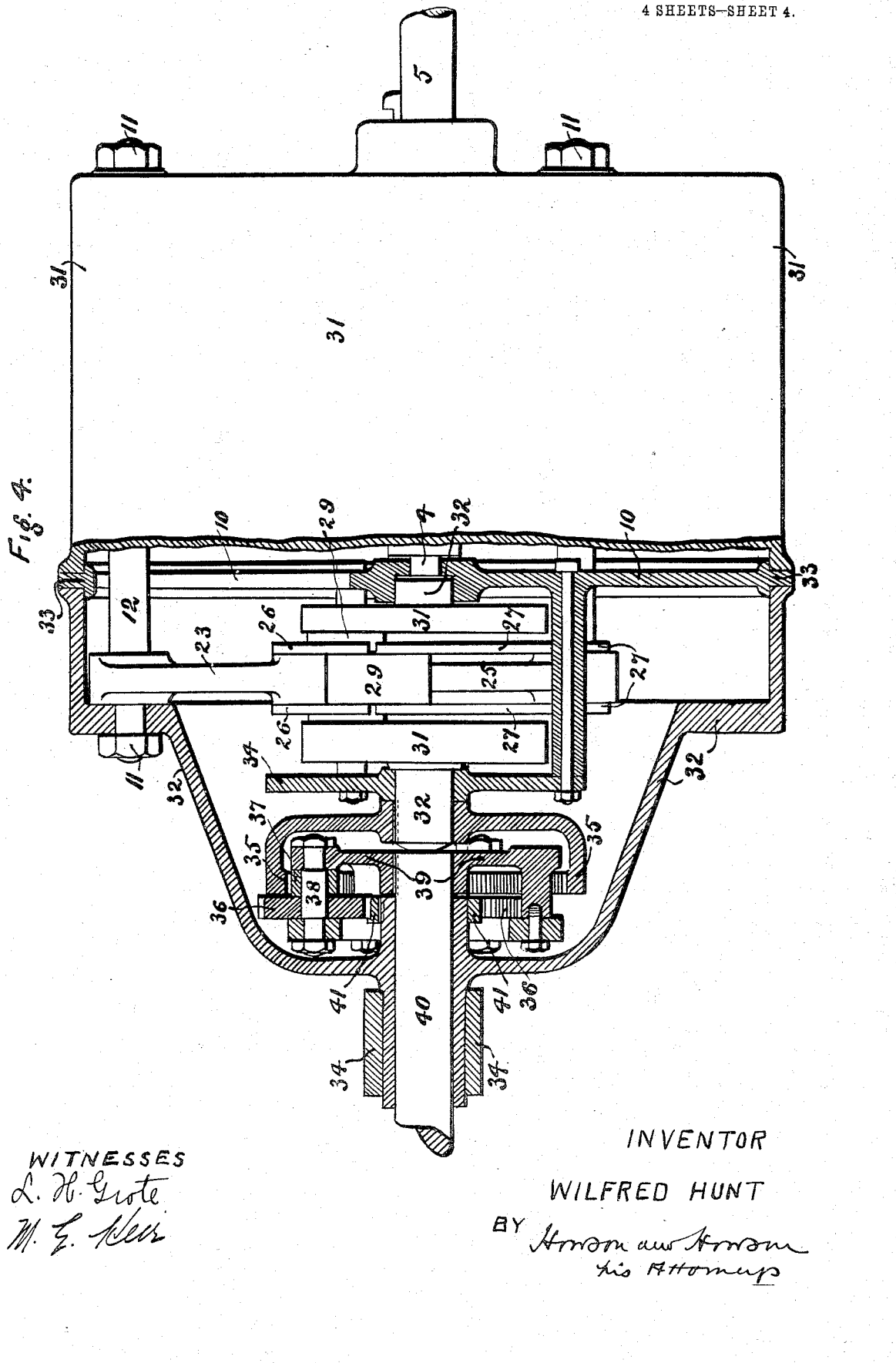

UNITED STATES PATENT OFFICE.

WILFRED HUNT, OF HILLHEAD, GLASGOW, SCOTLAND.

ROTARY MECHANISM FOR THE TRANSMISSION OF POWER.

1,127,251.　　　　　Specification of Letters Patent.　　Patented Feb. 2, 1915.

Application filed August 16, 1913. Serial No. 785,023.

*To all whom it may concern:*

Be it known that I, WILFRED HUNT, a subject of the King of Great Britain and Ireland, and a resident of Hillhead, Glasgow, Scotland, have invented a certain new and useful Rotary Mechanism for the Transmission of Power, of which the following is the specification.

The invention has for its object to provide a rotary mechanism for the transmission of power which from a constant or substantially or comparatively constant primary speed and torque will deliver a secondary speed and torque the product of these, but in which the torque varies with the resistance to be overcome and the speed varies inversely as the demand for torque. This function of varying is performed automatically, and there is thus provided between a constant speed and torque motor and that which it drives a device which suits itself to the demand of the drive for more torque and less speed, or less torque and more speed as may be the case. Further, as applied to a motor the speed (and corresponding torque) of which are variable, it in the same way very greatly increases the range of torque and relative speed available from it. The mechanism is therefore particularly applicable in motor vehicles.

The mechanism is essentially a speed—a relatively high speed—machine. It (the mechanism) is based on inertia effect and comprises three members: a primary or driving member, an inertia member, and a secondary or driven member. The inertia member comprises a number of—that is to say, one or more—inertia masses. These are so inflexibly interconnected (as hereinafter explained, the connection must be of necessity inflexible) with the primary and secondary members that they, the inertia masses, are oscillated a constant amount but at a speed proportionate to the difference in speed between the primary (high speed) member and the secondary (lower speed) member.

Although the inertia masses might be oscillated in a straight line (that is, be reciprocated) it is better as hereinafter shown that they be oscillated about an axis, and also, as will be made clear, it is better that they be balanced about their axes of oscillation. Therefore, in their simplest and best form, the inertia masses are flywheels. The primary and secondary members of course rotate about axes. These are preferably coincident with one another, and further the axes of the inertia masses are preferably also coincident with each other and with them. Thus the masses not only perform their functions of transmission but act as flywheels for the primary, while the whole apparatus may readily be made with that good rotational balance which is necessary in high speed mechanisms. Furthermore, such an arrangement avoids those very high centrifugal stresses upon the pivots of the masses which would occur were they otherwise than concentrically disposed. Again, in order to achieve balance and even drive (torque), the masses should oscillate in successive even phase and their numbers should be such that their oscillations overlap.

The action of the apparatus is based solely upon the fact that the power absorbed (from the primary member) in accelerating the masses and given off by them (to the secondary member) while retarding while during their oscillations they are being accelerated and retarded, varies as (the square of) the speed of acceleration and retardation. Therefore is it that their interconnection with the primary and secondary members must be what has been termed inflexible—with the meaning that any relative movement between the primary and secondary members must give an exact mechanically and geometrically corresponding amplitude of oscillation to the inertia masses. Were it otherwise, were springs (metallic springs or cylinder-and-piston air springs) interposed, the action would fail, for it is at once apparent that the resistance and reaction of a spring does not vary with the velocity with which it is stressed and allowed to recover. The whole essence and effect of the inflexibly connected inertia masses is that while the amplitude of their oscillation is constant, their speed of oscillation varies with the variation in speed between the primary and secondary and their reaction varies accordingly.

As has been said, inertia effect varies not directly but as the square of the variation of oscillation speed. Thus the product of speed drop and torque rise in the secondary member is not constant with the product of primary torque and speed but becomes greater. Therefore, the primary torque-speed product becomes greater. In many cases this would not matter. In other cases, the torque-speed-product in the primary could be maintained constant by a proportionate drop in primary speed. But in other cases, a practically absolutely constant torque and speed is desirable in the primary. In these cases there is provided a final or tertiary member from which the variably reduced speed is taken. Between this tertiary member and the primary and secondary members is interposed an epicyclic train of ordinary three-member type so proportioned that the speed drop is as the square root—thus the torque-speed product in the tertiary remains constant and also therefore in the primary.

It is to be understood that while what is considered the best construction is herein outlined—that it is not to be held as limitative—many other manners of associating the three essential primary, secondary and inertia members may be devised. A very effective arrangement is, however, to connect the coaxial flywheel inertia masses by links to levers pivoted on a spider or equivalent fixed on the primary shaft, which levers are in turn connected by links to a crank or cranks on the secondary shaft. It is of advantage that there should be a flywheel on the secondary shaft—when there is but one inertia mass it is practically essential that there should be such a flywheel.

Such a construction is shown by way of example in three accompanying sheets of explanatory drawings, Figure 1 Sheet 1 being a sectional side elevation, Fig. 2 Sheet 2 a sectional end elevation on the line $a$—$a$ Fig. 1, Fig. $2^a$ is an elevation of a detail, Fig. 3 Sheet 3 a like view on the line $b$—$b$ Fig. 1 (both looking toward the right in Fig. 1) while Fig. 4 Sheet 4 is a sectional elevation of a practically similar construction having embodied in it the epicyclic train hereinbefore referred to.

In the example shown in the drawings there are three masses in the form of flywheels 1, 2, 3. These are freely pivoted on an extension 4 of the primary shaft 5. On the primary shaft 5 is a spider 6 rigidly coupled to a second spider 7 by bolts 8 passed through long bosses 9 on each, and which bosses also serve to hold between their adjacent ends a three-armed supporting bracket 10 for the end of the extension 4 of the primary shaft. Between the spiders 6 and 7 are three bearing bolts 11 spaced 120 degrees apart. On these bearing bolts are sleeves 12, 13, 14. On the sleeves are lugs 15, 16, 17. Secured to each lug by bolts passed through it and them are pairs 18, 19, 20 of flat levers, each straddling a flywheel, (and curved to clear its boss in their swing) and each connected to the flywheel it straddles by a link 21 pivoted on the levers and pivoted on the flywheel at the edge of a clearance gap 22 in it. The sleeves 12, 13, 14, have also formed on them at their ends remote from the primary shaft 5 levers 23, 24, 25. To the ends of these levers are pivoted pairs of links 26, 27, 28 attached—one pair 26 by bolts 42, the others, 27, 28 by pivot pins 43, 44 to a common head 29 rotatable on a crank pin 30. This crank pin 30 is on a crank 31 fixed on the end of the secondary shaft 32, which shaft runs within a sleeve 33 clamped in a fixed bearing 34, the outside of the sleeve serving as a bearing for the spider 7 and thus insuring concentricity of the primary and secondary shafts.

Supposing now that the secondary shaft 32 be held stationary and the primary shaft 5 be rotated through one revolution carrying with it the spiders 6 and 7, the crank pin 30 will through the links 26, 27, 28 and levers 23, 24, 25 cause during this revolution an oscillation of the sleeves 12, 13, 14 to take place. This oscillation is transferred by the pairs of levers 18, 19, 20 to the flywheels 1, 2, 3. As the sleeves 12, 13, 14 are spaced equi-distantly at 120 degrees apart, the oscillations of the flywheels (which oscillate with an amplitude of approximately 120 degrees) will succeed one another in evenly-spaced and overlapping phase. It will be seen that if the secondary shaft 32 be turning as well as the primary shaft 5 but at a lower speed, one oscillation of each of the three flywheels will take place for each revolution of difference between the speed of the shafts—that is to say, if the primary shaft 5 runs at 900 r. p. m. and the secondary shaft 32 runs at 600 r. p. m. the flywheels will oscillate 300 times per minute.

It has already been explained that while the described mechanism without addition is perfectly feasible under many conditions, the effect of the inertia-effort increasing as the square of the difference in speed of primary and secondary shafts which leads to an increased torque in the primary shaft if the speed of it be kept constant, or to the necessity for a drop in its speed if its torque is to be kept constant, may be avoided by the interposition of an epicyclic train. An example of this combination is shown in Fig. 4. In regard to the inertia masses and the link-and-lever mechanism operating them this does not differ from that just described. Instead of the spiders 6 and 7 there is a drum-like case inclosing the whole. This case is made in halves 31, 32 held together by the bearing bolts 11 and holding firmly between their adjacent faces the recessed rim 33 of the bracket 10. This bracket serves not only to support the extension 4 of the primary shaft but also to receive in a bearing in it the secondary shaft 32 which now becomes a crank shaft and which is supported at its other end in a spider 34 carried on the bracket 10 by distance pieces and bolts. Upon the end of the secondary shaft 32 is secured the toothed ring member 35 of an epicyclic train. The planet wheels meshing with this consists of a series of pairs of pinions 36, 37, carried on studs 38 on a spider 39 fixed on the shaft 40 and which also mesh with a central pinion 41 forming the third member of the train and fixed within the drum half 32. The shaft 40 extends out through a sleeve on the drum part 32 which itself rotates in a fixed bearing 34. These examples are only illustrative—it is at once clear that the design of the mechanism may be very widely varied, for example, to secure greater amplitude of oscillation, or an adjustable amplitude of oscillation whereby the power transmitted under similar conditions may be regulated.

What I claim is:—

1. A rotary mechanism for the transmission of power comprising a primary or driving member, a secondary or driven member, and an inertia member consisting of a number of inertia masses and means so inflexibly interconnecting the three members jointly that the inertia masses are oscillated with a constant amplitude but at a speed proportionate to the difference in speed between the primary and secondary members.

2. A rotary mechanism for the transmission of power comprising a primary or driving member, a secondary or driven member, and an inertia member consisting of a number of inertia masses and means so inflexibly interconnecting the three members jointly that the inertia masses are oscillated with a constant amplitude but at a speed proportionate to the difference in speed between the primary and secondary members—the primary, secondary, and inertia members being coaxial and the masses of the inertia member being balanced about their axes of oscillation which are coincident with the axes of the primary and secondary members.

3. A rotary mechanism for the transmission of power comprising a primary or driving member, a secondary or driven member, and an inertia member consisting of a number of inertia masses and means consisting of levers rotating with the primary member, a crank part on the secondary member and means connecting the levers with the inertia and primary members in suchwise that the inertia masses are oscillated with a constant amplitude but at a speed proportionate to the difference in speed between the primary and secondary members.

4. A rotary mechanism for the transmission of power comprising a primary or driving member, a secondary or driven member, and an inertia member consisting of a number of inertia masses and means consisting of levers rotating with the primary member, a crank part on the secondary member and means connecting the levers with the inertia and primary members in suchwise that the inertia masses are oscillated with a constant amplitude but at a speed proportionate to the difference in speed between the primary and secondary members—the primary, secondary, and inertia members being co-axial and the masses of the inertia member being balanced about their axes of oscillation which are coincident with the axes of the primary and secondary members.

5. A rotary mechanism for the transmission of power comprising a primary or driving member, a secondary or driven member, and an inertia member consisting of a number of inertia masses and means so inflexibly interconnecting the three members jointly that the inertia masses are oscillated with a constant amplitude but at a speed proportionate to the difference in speed between the primary and secondary members, and a three-member epicyclic train, one member connected to the primary member, one to the secondary member and one to a tertiary and final-drive member.

6. A rotary mechanism for the transmission of power comprising a primary or driving member, a secondary or driven member, and an inertia member consisting of a number of inertia masses and means so inflexibly interconnecting the three members jointly that the inertia masses are oscillated with a constant amplitude but at a speed proportionate to the difference in speed between the primary and secondary members—the primary, secondary and inertia members being coaxial and the masses of the inertia member being balanced about their axes of oscillation which are coincident with the axes of the primary and secondary members, and a three-member epicyclic train, one member connected to the primary member, one to the secondary member and one to a tertiary and final-drive member.

7. A rotary mechanism for the transmission of power comprising a primary or driving member, a secondary or driven member, and an inertia member consisting of a number of inertia masses and means consisting of levers rotating with the primary member, a crank part on the secondary member and link equivalents connecting the levers with the inertia and primary members in suchwise that the inertia masses are oscillated with a constant amplitude but at a speed proportionate to the difference in speed between the primary and secondary members, and a three-member epicyclic train, one member connected to the primary member, one to the secondary member and one to a tertiary and final-drive member.

8. A rotary mechanism for the transmission of power comprising a primary or driving member, a secondary or driven member, and an inertia member consisting of a number of inertia masses and means consisting of levers rotating with the primary member, a crank part on the secondary member and link equivalents connecting the levers with the inertia and primary members in suchwise that the inertia masses are oscillated with a constant amplitude but at a speed proportionate to the difference in speed between the primary and secondary members—the primary, secondary, and inertia members being coaxial and the masses of the inertia member being balanced about their axes of oscillation which are coincident with the axes of the primary and secondary members, and a three-member epicyclic train, one member connected to the primary member, one to the secondary member and one to a tertiary and final-drive member.

In testimony whereof I have signed my name to this specification, in the presence of two subscribing witnesses.

WILFRED HUNT.

Witnesses:
 DAVID FERGUSON,
 JAMES EAGLESOM.